(12) United States Patent
Casci et al.

(10) Patent No.: US 9,597,671 B2
(45) Date of Patent: Mar. 21, 2017

(54) CATALYST FOR TREATING EXHAUST GAS

(71) Applicant: Johnson Matthey Public Limited Company, London (GB)

(72) Inventors: John Leonello Casci, Cleveland (GB); Jillian Elaine Collier, Reading (GB); Lucia Gaberova, Liverpool (GB)

(73) Assignee: Johnson Matthey Public Limited Company, London (GB)

( * ) Notice: Subject to any disclaimer, the term of this patent is extended or adjusted under 35 U.S.C. 154(b) by 21 days.

(21) Appl. No.: 14/699,347

(22) Filed: Apr. 29, 2015

(65) Prior Publication Data

US 2015/0238947 A1 Aug. 27, 2015

Related U.S. Application Data

(63) Continuation of application No. 14/212,784, filed on Mar. 14, 2014, now Pat. No. 9,044,744.

(60) Provisional application No. 61/792,904, filed on Mar. 15, 2013.

(51) Int. Cl.
| | | |
|---|---|---|
| *F01N 3/021* | (2006.01) |
| *F01N 3/035* | (2006.01) |
| *F01N 3/08* | (2006.01) |
| *B01J 23/72* | (2006.01) |
| *B01J 29/072* | (2006.01) |
| *B01D 53/94* | (2006.01) |
| *B01D 46/00* | (2006.01) |
| *B01J 29/76* | (2006.01) |
| *F01N 3/20* | (2006.01) |
| *B01J 37/02* | (2006.01) |
| *B01D 53/86* | (2006.01) |
| *B01J 29/70* | (2006.01) |
| *B01J 29/72* | (2006.01) |
| *B01J 29/74* | (2006.01) |
| *B01J 29/78* | (2006.01) |
| *B01J 29/80* | (2006.01) |
| *B01J 35/04* | (2006.01) |
| *B01J 35/10* | (2006.01) |
| *C01B 39/48* | (2006.01) |
| *B01J 29/08* | (2006.01) |
| *B01J 29/10* | (2006.01) |
| *B01J 29/16* | (2006.01) |
| *B01J 35/00* | (2006.01) |

(52) U.S. Cl.
CPC ...... *B01J 29/7615* (2013.01); *B01D 53/8628* (2013.01); *B01D 53/9418* (2013.01); *B01D 53/9422* (2013.01); *B01J 29/70* (2013.01); *B01J 29/7049* (2013.01); *B01J 29/72* (2013.01); *B01J 29/74* (2013.01); *B01J 29/76* (2013.01); *B01J 29/763* (2013.01); *B01J 29/78* (2013.01); *B01J 29/80* (2013.01); *B01J 35/0006* (2013.01); *B01J 35/04* (2013.01); *B01J 35/1076* (2013.01); *B01J 37/0201* (2013.01); *B01J 37/0246* (2013.01); *B01J 37/0248* (2013.01); *C01B 39/48* (2013.01); *F01N 3/20* (2013.01); *B01D 2255/20738* (2013.01); *B01D 2255/20761* (2013.01); *B01D 2255/50* (2013.01); *B01J 29/08* (2013.01); *B01J 29/085* (2013.01); *B01J 29/10* (2013.01); *B01J 29/16* (2013.01); *B01J 35/002* (2013.01); *B01J 2229/62* (2013.01)

(58) Field of Classification Search
CPC ........ F01N 3/035; F01N 3/021; F01N 3/0821; F01N 3/0842; B01D 53/9422; B01D 46/00; B01D 2255/20738; B01D 2255/20761; B01D 2253/108; B01J 23/72; B01J 23/745; B01J 29/072
See application file for complete search history.

(56) References Cited

U.S. PATENT DOCUMENTS

| | | | | |
|---|---|---|---|---|
| 8,603,432 B2 * | 12/2013 | Andersen | ........... | B01D 53/9418 423/210 |
| 2015/0118134 A1 * | 4/2015 | Marin | .................. | B01J 37/0246 423/213.7 |

FOREIGN PATENT DOCUMENTS

EP 2517778 A1 * 10/2012 ............. B01D 53/94

* cited by examiner

*Primary Examiner* — Timothy Vanoy
(74) *Attorney, Agent, or Firm* — Jimmie D. Johnson (57) ABSTRACT

Provided is a catalyst composition having an aluminosilicate molecular sieve having an AEI structure and a mole ratio of silica-to-alumina of about 20 to about 30 loaded with about 1 to about 5 weight percent of a promoter metal, based on the total weight of the molecular sieve material. Also provided are method, articles, and systems utilizing the catalyst composition.

18 Claims, 6 Drawing Sheets

CATALYST FOR TREATING EXHAUST GAS

CROSS-REFERENCE TO RELATED APPLICATIONS

This is a continuation of U.S. application Ser. No. 14/212,784, filed Mar. 14, 2014, which claims priority to U.S. Provisional Application No. 61/792,904, filed Mar. 15, 2013. The entire teachings of the above applications are incorporated herein by reference.

BACKGROUND

Field of Invention

The present invention relates to catalysts, articles, and methods for treating combustion exhaust gas.

Description of Related Art

Combustion of hydrocarbon-based fuel in electrical power stations and in engines produces flue or exhaust gas that contains, in large part, relatively benign nitrogen ($N_2$), water vapor ($H_2O$), and carbon dioxide ($CO_2$). But the flue and exhaust gases also contain, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically, flue gases from electrical power stations and exhaust gases lean burn gas engines have a net oxidizing effect due to the high proportion of oxygen that is provided to ensure adequate combustion of the hydrocarbon fuel. In such gases, one of the most burdensome components to remove is $NO_x$, which includes nitric oxide (NO), nitrogen dioxide ($NO_2$), and nitrous oxide ($N_2O$). The reduction of NO to $N_2$ is particularly problematic because the exhaust gas contains enough oxygen to favor oxidative reactions instead of reduction. Notwithstanding, NO can be reduced by a process commonly known as Selective Catalytic Reduction (SCR). An SCR process involves the conversion of $NO_x$, in the presence of a catalyst and with the aid of a reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the NO reduction reaction takes place as the gases pass through or over the catalyzed substrate. The chemical equation for stoichiometric SCR reactions using ammonia is:

$4NO + 4NH_3 + O_2 \rightarrow 4N_2 + 6H_2O$ $2NO_2 + 4NH_3 + O_2 \rightarrow 3N_2 + 6H_2O$ $NO + NO_2 + 2NH_3 \rightarrow 2N_2 + 3H_2O$ Zeolites (i.e., aluminosilicates) having a BEA, MOR, CHA or certain other structures are known to be useful as SCR catalysts. Such zeolites have a molecularly porous crystalline or pseudo-crystalline structure constructed primarily of alumina and silica. The catalytic performance of these zeolites may be improved by incorporating a metal— for example, by a cationic exchange wherein a portion of ionic species existing on the surface of the framework is replaced by metal cations, such $Cu^{2+}$. Typically, higher metal concentrations correspond to higher catalytic performance.

While the SCR performance of such catalysts is acceptable at normal exhaust gas temperatures of a diesel engine, the catalyst may become exposed to unexpected temperature spikes (e.g., >800° C.) during its useful life. In general, a zeolite's hydrothermal stability can be improved by increasing the zeolite's silica-to-alumina ratio (SAR). However, higher SARs typically limit the amount of metal that can be loaded on the zeolite.

Copper loaded CHA zeolites are known to provide adequate SCR performance provided that the catalyst is not exposed to temperatures in excess of 800° C. However, there remains a need for improved SCR catalysts that are capable of withstanding even higher temperatures with little or no deactivation. The present invention satisfies this need amongst others.

SUMMARY OF THE INVENTION

Surprisingly, it has been found that metal-promoted zeolites having an AEI structure and a silica-to-alumina ratio (SAR) of about 20 to about 30 are more hydrothermally stable compared to other zeolite catalysts with similar SARs and similar metal loadings. The catalysts of the present invention provide improved catalytic performance in applications such as selective catalytic reduction (SCR) of $NO_x$ and oxidation of ammonia when compared to other catalysts, particularly after the catalysts have been subjected to high temperatures.

Accordingly, in one aspect of the invention, provided is a catalyst composition comprising an aluminosilicate molecular sieve having an AEI structure and a mole ratio of silica-to-alumina of about 20 to about 30 and about 1 to about 5 weight percent of a promoter metal, based on the total weight of the molecular sieve material.

According to another aspect of the invention, provided is a method for treating an exhaust gas comprising (a) contacting an exhaust gas comprising $NO_x$ and a reductant with a catalyst composition described herein; and (b) selectively reducing at least a portion of the $NO_x$ to $N_2$ and $H_2O$.

According to another aspect of the invention, provided is a catalytic article comprising a catalyst composition described herein and a substrate upon and/or within which the catalyst is disposed.

According to yet another aspect of the invention, provided is system for treating exhaust gas comprising (a) a catalyst article described herein; and (b) one or more upstream components selected from a diesel oxidation catalyst, a NOx absorber catalyst, a lean NOx trap, a filter, an NH3 injector, and an SCR catalyst; and (c) optionally a downstream ammonia slip catalyst.

DETAILED DESCRIPTION OF PREFERRED EMBODIMENTS OF THE INVENTION

In a preferred embodiment, the invention is directed to a catalyst article for improving environmental air quality, particularly for improving flue or other exhaust gas emissions generated by power plants, gas turbines, lean burn internal combustion engines, and the like. Exhaust gas emissions are improved, at least in part, by reducing $NO_x$ and/or $NH_3$ concentrations lean burn exhaust gas over a broad operational temperature range. Useful catalysts are those that selectively reduce $NO_x$ and/or oxidize ammonia in an oxidative environment (i.e., an SCR catalyst and/or AMOX catalyst).

In certain embodiments, provided is a catalyst composition comprising a zeolite material having an AEI structure and a silica-to-alumina mole ratio (SAR) of about 20 to about 30 and about 1 to about 10 weight percent of a promoter metal based on the total weight of the zeolite material.

Preferred zeolites are aluminosilicates having a crystalline or pseudo crystalline AEI structure. As used herein, the term "AEI" refers to an AEI framework type as recognized by the International Zeolite Association (IZA) Structure Commission. The majority of the aluminosilicate zeolite structure is constructed of alumina and silica, but may include framework metals other than aluminum (i.e., metal-substituted zeolites). As used herein, the term "metal substituted" with respect to a zeolite means a zeolite framework having one or more aluminum or silicon framework atoms replaced by a substituting metal. In contrast, the term "metal exchanged" means a zeolite having extra-framework or free metal ions associated with the framework structure, but not form part of the framework itself. Examples of metal-substituted AEI frameworks include those that comprise framework iron and/or copper atoms. Any aluminosilicate isotype of AEI is suitable for the present invention.

Preferably, the primary crystalline phase of the molecular sieve is AEI, although other crystalline phases such as FAU may also be present. In certain embodiments, the primary crystalline phase comprises at least about 90 weight percent AEI, preferably at least about 95 weight percent AEI, and even more preferably at least about 98 or at least about 99 weight percent AEI. The molecular sieve may contain FAU in minor amounts, preferably less than 5 weight percent, and even more preferably less than about 2 weight percent, or even less than about 1 weight percent. Preferably, the AEI molecular sieve is substantially free of other crystalline phases and is not an intergrowth of two or more framework types. By "substantially free" with respect to other crystalline phases, it is meant that the molecular sieve contains at least 99 weight percent AEI.

Preferred zeolites have a mole silica-to-alumina ratio (SAR) of about 20 to about 30, more preferably about 20 to about 25, for example about 20 to about 22, about 22 to about 25, or about 25 to about 30. The silica-to-alumina ratio of zeolites may be determined by conventional analysis. This ratio is meant to represent, as closely as possible, the ratio in the rigid atomic framework of the zeolite crystal and to exclude silicon or aluminum in the binder or in cationic or other form within the channels. Since it may be difficult to directly measure the silica to alumina ratio of zeolite after it has been combined with a binder material, particularly an alumina binder, these silica-to-alumina ratios are expressed in terms of the SAR of the zeolite per se, i.e., prior to the combination of the zeolite with the other catalyst components.

In addition to the AEI zeolite, the catalyst composition comprises at least one promoter metal disposed on and/or within the zeolite material as extra-framework metals. As used herein, an "extra-framework metal" is one that resides within the molecular sieve and/or on at least a portion of the molecular sieve surface, preferably as an ionic species, does not include aluminum, and does not include atoms constituting the framework of the molecular sieve. Preferably, the presence of the promoter metal(s) facilitates the treatment of exhaust gases, such as exhaust gas from a diesel engine, including processes such as $NO_x$ reduction, $NH_3$ oxidation, and $NO_x$ storage.

The promoter metal may be any of the recognized catalytically active metals that are used in the catalyst industry to form metal-exchanged zeolites, particularly those metals that are known to be catalytically active for treating exhaust gases derived from a combustion process. Particularly preferred are metals useful in $NO_x$ reduction and storage processes. Promoter metal should be broadly interpreted and specifically includes copper, nickel, zinc, iron, tungsten, molybdenum, cobalt, titanium, zirconium, manganese, chromium, vanadium, niobium, as well as tin, bismuth, and antimony; platinum group metals, such as ruthenium, rhodium, palladium, indium, platinum, and precious metals such as gold and silver. Preferred transition metals are base metals, and preferred base metals include those selected from the group consisting of chromium, manganese, iron, cobalt, nickel, and copper, and mixtures thereof. In a preferred embodiment, at least one of the promoter metals is copper. Other preferred promoter metals include iron, particularly in combination with copper.

In certain embodiments, the promoter metal is present in the zeolite material at a concentration of about 0.1 to about 10 weight percent (wt %) based on the total weight of the zeolite, for example from about 0.5 wt % to about 5 wt %, from about 0.5 to about 1 wt %, from about 1 to about 5 wt %, about 2.5 wt % to about 3.5 wt %, and about 3 wt % to about 3.5 wt %. For embodiments which utilize copper, iron, or the combination thereof, the concentration of these transition metals in the zeolite material is preferably about 1 to about 5 weight percent, more preferably about 2.5 to about 3.5 weight percent.

In certain embodiments, the promoter metal, such as copper, is present in an amount from about 80 to about 120 g/ft$^3$ of zeolite or washcoat loading, including for example about 85 to about 95 g/ft$^3$, or about 90 to about 95 g/ft$^3$.

In certain embodiments, the promoter metal is present in an amount relative to the amount of aluminum in the zeolite, namely the framework aluminum. As used herein, the promoter metal:aluminum (M:Al) ratio is based on the relative molar amount of promoter metal to molar framework Al in the corresponding zeolite. In certain embodiments, the catalyst material has a M:Al ratio of about 0.1 to about 1.0, preferably about 0.2 to about 0.5. An M:Al ratio of about 0.2 to about 0.5 is particularly useful where M is copper, and more particularly where M is copper and the SAR of the zeolite is about 20-25.

In one example, a metal-exchanged zeolite is created by blending the zeolite into a solution containing soluble precursors of the catalytically active metal(s). The pH of the solution may be adjusted to induce precipitation of the catalytically active metal cations onto or within the zeolite structure (but not including the zeolite framework). For example, in a preferred embodiment, an AEI zeolite material is immersed in a solution containing copper nitrate for a time sufficient to allow incorporation of the catalytically active copper cations into the molecular sieve structure by ion exchange. Un-exchanged copper ions are precipitated out. Depending on the application, a portion of the un-exchanged ions can remain in the molecular sieve material as free copper. The metal-exchanged zeolite may then be washed, dried, and calcined.

Generally, ion exchange of the catalytic metal cation into or on the molecular sieve may be carried out at room temperature or at a temperature up to about 80° C. over a period of about 1 to 24 hours at a pH of about 7. The resulting catalytic molecular sieve material is preferably dried at about 100 to 120° C. overnight and calcined at a temperature of at least about 500° C.

In certain embodiments, the catalyst composition comprises the combination of at least one promoter metal and at least one alkali or alkaline earth metal, wherein the transition metal(s) and alkali or alkaline earth metal(s) are disposed on or within the zeolite material. The alkali or alkaline earth metal can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. In certain embodiments, alkali metals are preferred. In certain embodiments, alkaline earth metals are preferred. Preferred alkali or alkaline earth metals include calcium, potassium, and combinations thereof. In certain embodiments, the catalyst composition is essentially free of magnesium and/or barium. In certain embodiments, the catalyst is essentially free of any alkali or alkaline earth metal except calcium and potassium. In certain embodiments, the catalyst is essentially free of any alkali or alkaline earth metal except calcium. And in certain other embodiments, the catalyst is essentially free of any alkali or alkaline earth metal except potassium. As used herein, the term "essentially free" means that the material does not have an appreciable amount of the particular metal. That is, the particular metal is not present in amount that would affect the basic physical and/or chemical properties of the material, particularly with respect to the material's capacity to selectively reduce or store $NO_x$.

In certain embodiments, the zeolite material has an alkali content of less than 3 weight percent, more preferably less than 1 weight percent, and even more preferably less than 0.1 weight percent.

In certain embodiments, the alkali and/or alkaline earth metal (collectively $A_M$) is present in the zeolite material in an amount relative to the amount of promoter metal (M) in the zeolite. Preferably, the M and $A_M$ are present, respectively, in a molar ratio of about 15:1 to about 1:1, for example about 10:1 to about 2:1, about 10:1 to about 3:1, or about 6:1 to about 4:1, particularly were M is copper and $A_M$ is calcium. In certain embodiments which include an alkali and/or alkaline earth metal such as calcium, the amount of copper present is less than 2.5 weight percent, for example less than 2 weight percent or less than 1 weight percent, based on the weight of the zeolite.

In certain embodiments, the relative cumulative amount of promoter metal (M) and alkali and/or alkaline earth metal ($A_M$) is present in the zeolite material in an amount relative to the amount of aluminum in the zeolite, namely the framework aluminum. As used herein, the (M+$A_M$):Al ratio is based on the relative molar amounts of M+$A_M$ to molar framework Al in the corresponding zeolite. In certain embodiments, the catalyst material has a (M+$A_M$):Al ratio of not more than about 0.6. In certain embodiments, the (M+$A_M$):Al ratio is not more than 0.5, for example about 0.05 to about 0.5, about 0.1 to about 0.4, or about 0.1 to about 0.2.

The promoter metal and alkali/alkaline earth metal can be added to the molecular sieve via any known technique such as ion exchange, impregnation, isomorphous substitution, etc. The promoter metal and the alkali or alkaline earth metal can be added to the zeolite material in any order (e.g., the metal can be exchanged before, after, or concurrently with the alkali or alkaline earth metal), but preferably the alkali or alkaline earth metal is added prior to or concurrently with the promoter metal, particularly when the alkali earth metal is calcium and the promoter metal is copper.

In certain embodiments, the metal promoted zeolite catalysts of the present invention also contain a relatively large amount of cerium (Ce). In certain embodiments, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite. In certain embodiments, the cerium concentration in the catalyst material is about 50 to about 550 $g/ft^3$. Other ranges of Ce include: above 100 $g/ft^3$, above 200 $g/ft^3$, above 300 $g/ft^3$, above 400 $g/ft^3$, above 500 $g/ft^3$, from about 75 to about 350 $g/ft^3$, from about 100 to about 300 $g/ft^3$, and from about 100 to about 250 $g/ft^3$.

In certain embodiments, the concentration of Ce exceeds the theoretical maximum amount available for exchange on the metal-promoted zeolite. Accordingly, in some embodiments, Ce is present in more than one form, such as Ce ions, monomeric ceria, oligomeric ceria, and combinations thereof, provided that said oligomeric ceria has a mean crystal size of less than 5 µm, for example less than 1 µm, about 10 nm to about 1 µm, about 100 nm to about 1 µm, about 500 nm to about 1 µm, about 10 to about 500 nm, about 100 to about 500 nm, and about 10 to about 100 nm. As used herein, the term "monomeric ceria" means $CeO_2$ as individual molecules or moieties residing freely on and/or in the zeolite or weakly bonded to the zeolite. As used herein, the term "oligomeric ceria" means nanocrystalline $CeO_2$ residing freely on and/or in the zeolite or weakly bonded to the zeolite.

Catalysts of the present invention are applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. In certain embodiments, a washcoat containing the catalyst is applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, in certain embodiments provided is a catalyst article comprising a metal-promoted AEI zeolite catalyst described herein coated on and/or incorporated into a substrate.

Certain aspects of the invention provide a catalytic washcoat. The washcoat comprising the AEI catalyst described herein is preferably a solution, suspension, or slurry. Suitable coatings include surface coatings, coatings that penetrate a portion of the substrate, coatings that permeate the substrate, or some combination thereof.

In certain aspect, the invention is a catalyst composition comprising AEI aluminosilicate molecular sieve crystals having a mean crystal size (i.e., of individual crystals including twinned crystals) of greater than about 0.5 µm, preferably between about 0.1 and about 15 µm, such as about 0.5 to about 5 µm, about 0.7 to about 1.5 µm, about 1 to about 5 µm, or about 1 µm to about 10 µm, particularly for catalysts which are free or substantially free of halogens, such as fluorine. Crystal size is the length of one edge of a face of the crystal, preferably the longest edge provided that the crystals are not needle-shaped. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of the straight edge are measured and recorded. (Particles that are clearly large polycrystalline aggregates should not be included the measurements.) Based on these measurements, the arithmetic mean of the sample crystal sizes is calculated.

In addition to the mean crystal size, catalyst compositions preferably have a majority of the crystal sizes are greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. Preferably, the first and third quartile of the sample of crystals sizes is greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm.

In certain aspects, the catalyst is a metal promoted AEI zeolite having an SAR of about 15 to about 25, such as about 15 to about 17, and having a mean crystal size of about 0.1 to about 10 µm, such as about 0.5 to 5 µm, or 0.5 to 1.5 µm, particularly where such catalyst are free or substantially free of halogens, such as fluorine. Preferred promoter metals for such catalyst include copper and iron. Preferably, such AEI zeolites are synthesized using a N,N-Dimethyl-3,5-dimethylpiperidinium hydroxide template. Such catalysts demonstrate high hydrothermal durability and also yield high $NO_x$ conversions when used as SCR catalysts.

In certain aspects, the invention is an SCR catalyst comprising two or more catalytic materials arranged in separate zones or formulated as blends. For example, in certain aspects, the SCR catalyst comprises a first zone comprising a metal promoted AEI zeolite as defined herein, and a second zone containing a second catalyst such as an SCR catalyst. The first and second zones may be on a single substrate, such as wall-flow filter or a flow-through honeycomb, or on separate substrates, but are preferably disposed on or within a single unit of substrate. Examples of a second catalyst include molecular sieves, such as aluminosilicates, silicoaluminophosphates, and ferrosilicates including small pore molecular sieves, medium pore molecular sieves, and large pore molecular sieves. For certain applications, small pore zeolites and SAPOs are preferred. An example of a small pore molecular sieve is CHA. Another example of a small pore molecular sieve is AFX. Other small pore molecular sieves include AEI, DDR, LEV, ERI, RHO, AFX, AFT, and KFI. Other useful molecular sieves include BEA, MFI, MOR, and FER. The molecular sieve of the second catalyst cab be in the H+ form, and/or can be exchanged with a transition metal, such as Cu, Fe, Ni, Co, and Mn, a noble metal such as Au, Ag, Pt, Pd, and Ru, or some combination thereof. Particularly useful metals include Fe and Cu. Other examples of a second catalyst include vanadium catalysts, such as $V_2 O_5$ supported on silica, titania, or alumina, and optionally in combination with other metals such as tungsten and/or molybdenum. The first zone can be upstream or downstream of the second zone with respect to flow of exhaust gas, but is preferably downstream. The upstream zone and downstream zone can correspond to the front end and rear end, respectively, of a flow-through honeycomb substrate, or can correspond to the inlet and outlet sides, respectively, of a wall-flow filter. The two zones can partially or fully overlap each other. For partial overlap, the overlapping section will create a third, intermediate zone. Alternatively, the two zones may be adjacent to one another, with little or no gap between them (i.e., less than 0.2 inches). Alternatively, the first and second catalysts may be blended together and washcoated as a single catalyst layer or extruded as a homogeneous honeycomb substrate. In certain aspects, the catalyst further comprises a third catalysts material which is blended with one or both of the first and second catalytic materials or is disposed in a third zone, wherein the third zone is downstream or upstream of the first and/or second catalyst, but is preferably on the same substrate.

A washcoat can also include non-catalytic components, such as fillers, binders, stabilizers, rheology modifiers, and other additives, including one or more of alumina, silica, non-zeolite silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. In preferred embodiments, the washcoat loading is >0.3 $g/in^3$, such as >1.2 $g/in^3$, >1.5 $g/in^3$, >1.7 $g/in^3$ or >2.00 $g/in^3$, and preferably <3.5 $g/in^3$, such as <2.5 $g/in^3$. In certain embodiments, the washcoat is applied to a substrate in a loading of about 0.8 to 1.0 $g/in^3$, 1.0 to 1.5 $g/in^3$, or 1.5 to 2.5 $g/in^3$.

Two of the most common substrate designs are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A Honeycomb configuration is typically smaller than a plate type, which is an advantage in mobile applications, but has higher pressure drops and plug more easily. In certain embodiments the plate substrate is constructed of metal, preferably corrugated metal.

In certain embodiments, the invention is a catalyst article made by a process described herein. In a particular embodiment, the catalyst article is produced by a process that includes the steps of applying a metal-promoted AEI zeolite composition, preferably as a washcoat, to a substrate as a layer either before or after at least one additional layer of another composition for treating exhaust gas has been applied to the substrate. The one or more catalyst layers on the substrate, including the metal-promoted AEI catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

In certain embodiments, the metal-promoted AEI catalyst is disposed on the substrate as a first layer and another composition, such as an oxidation catalyst, reduction catalyst, scavenging component, or $NO_x$ storage component, is disposed on the substrate as a second layer. In other embodiments, the metal-promoted AEI catalyst is disposed on the substrate as a second layer and another composition, such as such as an oxidation catalyst, reduction catalyst, scavenging component, or $NO_x$ storage component, is disposed on the substrate as a first layer. As used herein the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. In certain embodiments, the second layer is applied to an inert substrate as a bottom layer and the first layer is top layer that is applied over the second layer as a consecutive series of sub-layers. In such embodiments, the exhaust gas penetrates (and hence contacts) the first layer, before contacting the second layer, and subsequently returns through the first layer to exit the catalyst component. In other embodiments, the first layer is a first zone disposed on an upstream portion of the substrate and the second layer is disposed on the substrate as a second zone, wherein the second zone is downstream of the first.

In another embodiment, the catalyst article is produced by a process that includes the steps of applying a metal-promoted AEI zeolite catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the metal-promoted AEI zeolite catalyst composition can be applied to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components in certain embodiments are designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 µm, for example about 20 to about 30 µm, about 10 to about 25 µm, about 10 to about 20 µm, about 20 to about 25 µm, about 10 to about 15 µm, and about 15 to about 20 µm.

In general, the production of an extruded solid body containing the metal promoted AEI catalyst involves blending the AEI zeolite and the promoter metal (either separately or together as a metal-exchanged zeolite), a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. A metal-promoted AEI zeolite catalyst may also be washcoated or otherwise applied to the extruded solid body as one or more sub-layers that reside on the surface or penetrate wholly or partly into the extruded solid body. Alternatively, a metal-promoted AEI zeolite can be added to the paste prior to extrusion.

Extruded solid bodies containing metal-promoted AEI zeolites according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the metal-promoted AEI zeolite is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The metal-promoted AEI catalyst described herein can promote the reaction of a reductant, preferably ammonia, with nitrogen oxides to selectively form elemental nitrogen ($N_2$) and water ($H_2O$). Thus, in one embodiment, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

The metal-promoted AEI catalyst described herein can also promote the oxidation of ammonia. Thus, in another embodiment, the catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). In certain embodiments, the metal-promoted AEI zeolite catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

In yet another embodiment, an SCR and AMOX operations are performed in series, wherein both processes utilize a catalyst comprising the metal-promoted AEI zeolite described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. In certain embodiments, provided is a catalyst article having an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, the SCR and/or AMOX process is performed at a temperature of at least 100° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In another embodiment, all or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as 20 to 60 $g/ft^3$. Alternatively, the precious metal of the catalyst is characterized by the average concentration which may be from about 40 to about 100 grams/$ft^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the metal-promoted AEI zeolite described herein and at least one additional component for treating the exhaust gas, wherein the catalytic article and at least one additional component are designed to function as a coherent unit.

In certain embodiments, the system comprises a catalytic article comprising a metal-promoted AEI zeolite described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$.

In another embodiment, the system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

EXAMPLES

Example 1

Synthesis of AEI zeolite (SAR=22)

A reaction gel of (molar) composition of 60 parts SiO2, 1.2 parts $Al_2O_3$, 13.41 parts $Na_2O$, 9.5 parts N,N-diethyl-2, 6-dimethylpiperidinium hydroxide (22.23 wt % solution), and 2721 parts $H_2O$ was prepared as follows: About 130.6 grams of a source of silica (30 wt % SiO2) was changed into a 1 Liter stainless steel autoclave with the agitator set to rotate at 300 rpm. About 341.4 g of 1 N NaOH was mixed in a beaker with 98.3 g of the template. About 7.6 g of ammonium exchanged Y zeolite was added to this mixture. The mixture was stirred at room temperature for 10-15 min before being added to the colloidal silica in the autoclave. The autoclave was sealed and mixing continued, at room temperature, for a further 10 min before being heated to 135° C. The temperature was maintained for 12 days then the autoclave was cooled to room temperature, the product discharged then filtered, washed with demineralized water and dried at 110° C. overnight.

Figure 1:
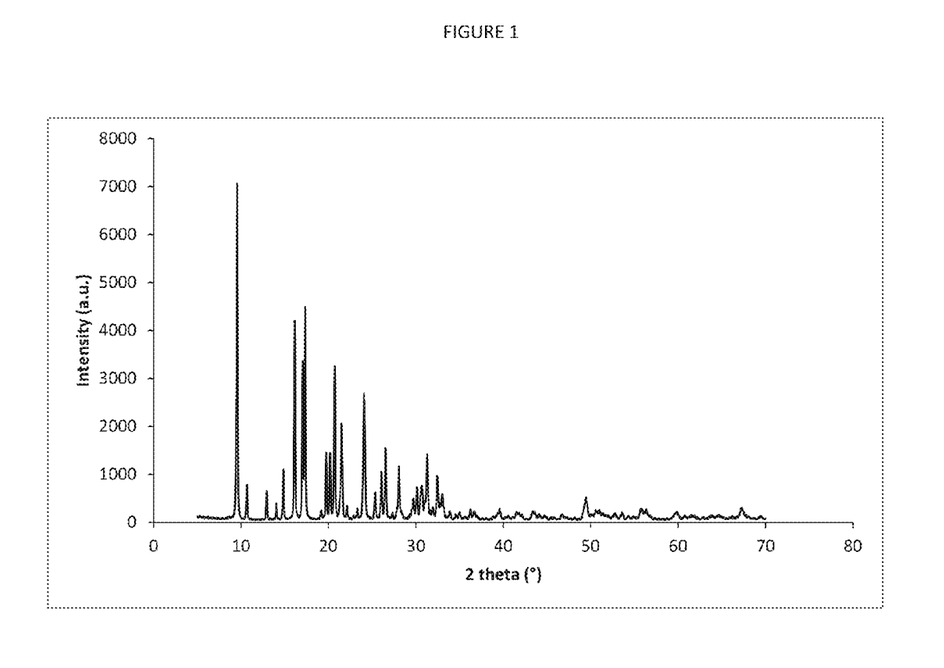
FIG. 1 shows an XRD pattern of an AEI aluminosilicate having an SAR of 22.

The resulting product was analyzed by powder x-ray powder diffraction and found to be a highly crystalline AEI type zeolite. The XRD Pattern for this material is shown in FIG. 1.

A portion of the material was then activated by conventional calcination and ion-exchange methods. The sample was first calcined by heating the sample, in air, from room temperature to 110° C. at 2° C. per minute and held at that temperature for 10 hours then ramped to 450° C. at 5° C. per minute and held at that temperature for 16 hours following which it was heated to 550° C., at 5° C. per minute, and held at that temperature for a period of 16 hours before being cooled to room temperature. The ion-exchange was carried out by contacting the calcined zeolite, at room temperature, with a 1 M solution of ammonium chloride solution using 10 cc of solution per gram of calcined zeolite. After one hour the agitation was stopped the zeolite allowed to settle and the supernatant syphoned off. The procedure was repeated using a fresh batch of ammonium chloride solution following which the zeolite was filtered, washed with de-mineralized water and then dried at 110° C. overnight to generate $NH_4$-AEI zeolite.

To convert this material to H-AEI, the material was calcined by heating, in air, to 150° C. at 2° C. per minute then held at 150° C. for 10 hours before being ramped to 450° C. at 5° C. per minute and held at that temperature for 16 hours. Analysis of the material by XRF showed a compositional SAR of 22.

Example 2

Synthesis of AEI zeolite (SAR=20)

A reaction gel was prepared by a similar method and using reagents similar to that as that described in Example 1 above except that the template was a 22.23 wt % solution. In this case the reaction gel had a (molar) composition: 60 parts $SiO_2$, 1.21 parts $Al_2O_3$, 15.0 parts $Na_2O$, 9.5 parts template, and 2721 parts $H_2O$. The reaction was carried out in a 1.5 autoclave with stirring at 300 rpm. The reaction was carried out at 135° C. for 8 days before cooled to room temperature, discharged from the autoclave and filtered, washed and dried at 110° C. overnight.

The material was then activated in a manner to that described in Example 1 resulting in an H-AEI zeolite that was shown by XRD to be highly crystalline and by XRF to have an SAR of 20.

Comparative Example 1

Synthesis of AEI Zeolite (SAR=14)

A reaction gel of (molar) composition having 60 parts $SiO_2$, 1.704 parts $Al_2O_3$, 15.7 parts $Na_2O$, 9.5 parts template (N,N-diethyl-2,6-dimethylpiperidinium hydroxide (19.34 % w/w solution)), and 2721 parts $H_2O$ was prepared as follows: about 123.9 g of a silica source (30 wt % $SiO_2$) was charged into a 1 stainless steel autoclave and with the agitator set to rotate at 300 rpm. About 399.65 g of 1 N NaOH was mixed in a beaker with 113.09 g of the template. To this mixture was added 10.7 g ammonium exchanged Y zeolite. The mixture was stirred at room temperature for approximately 10 min before being added to the colloidal silica in the autoclave. The autoclave was sealed and mixing continued, at room temperature, for a further 10 min before being heated to 135° C. The temperature was maintained for approximately 7 days then the autoclave was cooled to room temperature, the product discharged then filtered, washed with de-mineralized water and dried at 110° C. overnight.

The resulting product was analyzed by powder x-ray powder diffraction and found to be, largely, an AEI type zeolite. Analysis by XRF showed the product to have an SAR of 14.

A portion of the material was then activated by conventional calcination and ion-exchange methods. The sample was first calcined by heating the sample, in air, from room temperature to 110° C. at 2° C. per minute and held at 110° C. for 10 hours, then ramped 450 ° C. at 5° C. per minute and held at that temperature for 16 hours following which it was heated to 550° C., at 5° C. per minute, and again held at that temperature for a period of 16 hours before being cooled to room temperature. The ion-exchange was carried out by contacting the calcined zeolite, at room temperature, with a 1M solution of ammonium chloride solution using 10 cc of solution per gram of calcined zeolite. After one hour the agitation was stopped the zeolite allowed to settle and the supernatant syphoned off. The procedure was repeated using a fresh batch of ammonium chloride solution following which the zeolite was filtered, washed with de-mineralized water and then dried at 110° C. overnight to generate $NH_4$-AEI zeolite.

To convert this material to H-AEI the material was calcined by heating, in air, to 150° C. at 2° C. per minute then held at 150° C. for 10 hours before being ramped to 450° C. at 5° C. per minute and held at that temperature for 16 hours. The resulting material was highly crystalline, as shown by powder XRD.

Comparative Example 2

Synthesis of AEI Zeolite (SAR=17)

A reaction gel was prepared by a similar method as that described in Comparative Example 1 above. In this case the reaction gel had a (molar) composition: 60 parts $SiO_2$, 1.34 parts $Al_2O_3$, 15.7 parts $Na_2O$, 9.5 parts template, and 2721 parts $H_2O$ and was prepared using similar reagents except that the template was a 19.34% w/w aqueous solution. The quantities of the reagents used were: 128.8 g of the silica source, 8.42 g of zeolite Y, 399.6 g of 1 M sodium hydroxide solution, 113 g of the N,N-diethyl-2,6-dimethylpiperidinium hydroxide template, and 33.1 g demineralized water.

As with Example 1 a 1L stainless steel autoclave was employed with stirring at 300 rpm. Once all the reagents had been added the autoclave was sealed and left stirring at room temperature for 30 minutes before being heated to 135° C. and maintained at that temperature for 7 days following which it was cooled to room temperature, discharged from the autoclave and filtered, washed and dried at 110° C. overnight. The material was then activated in a manner to that described in Example 1 resulting in an H-AEI zeolite that was shown by XRD to be highly crystalline and by XRF to have an SAR of 17.

Comparative Example 3

Synthesis of AEI Zeolite (SAR=18)

A reaction gel was prepared by a similar method and using reagents similar to that as that described in Comparative Example 1 above. In this case the reaction gel had a (molar) composition: 60 parts SiO2, 1.34 parts Al2O3, 15.08 parts Na2O, 9.5 parts template, and 2721 parts H2O.

The reaction was carried out in a 1 autoclave and was reacted at 135° C. for 7 days before cooled to room temperature, discharged from the autoclave and filtered, washed and dried at 110° C. overnight. The material was then activated in a manner to that described in Example 1 resulting in an H-AEI zeolite that was shown by XRD to be highly crystalline and by XRF to have an SAR of 18.

Example 3

$NO_x$ Conversion Performance after High Temperature Aging

A 5 gram sample of AEI (SAR=22) aluminosilicate powder similar to that described in Example 1 was treated with copper acetate using an incipient wetness technique to produce a catalyst loaded with 3 weight percent copper. Copper loaded samples of AEI (SAR 18), AEI (SAR 19), and AEI (SAR 20) were prepared using similar techniques. In addition, a 3 weight percent copper loaded sample of an aluminosilicate having a CHA structure (SAR=16) and a copper loaded sample of an aluminosilicate having a CHA structure (SAR=22) were also prepared using a similar technique.

Figure 2A:
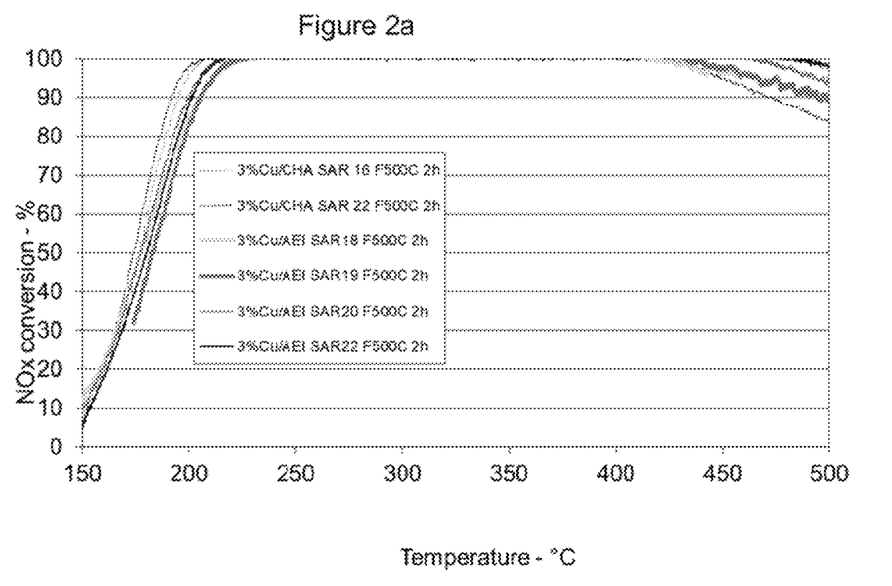
FIGS. 2a and 2b show $NO_x$ conversion performance of copper loaded AEI aluminosilicates and copper loaded CHA aluminosilicates after moderate and high temperature hydrothermal aging.

A portion of the material from each catalyst sample was hydrothermally aged at 500° C./4.5% water in air for 2 hours. After aging the powder samples were separately loaded into a synthetic catalyst activity test (SCAT) reactor and tested using a synthetic diesel exhaust gas mixture (at inlet) containing the following: 500 ppm NO, 385 ppm $NH_3$, 10% $O_2$, 10% $H_2O$, balance $N_2$ at a space velocity of 60,000 $h^{-1}$. The NOx conversion performance of each sample was tested over a range of temperatures. The results of these tests are provided in FIG. 2a.

Figure 2B:
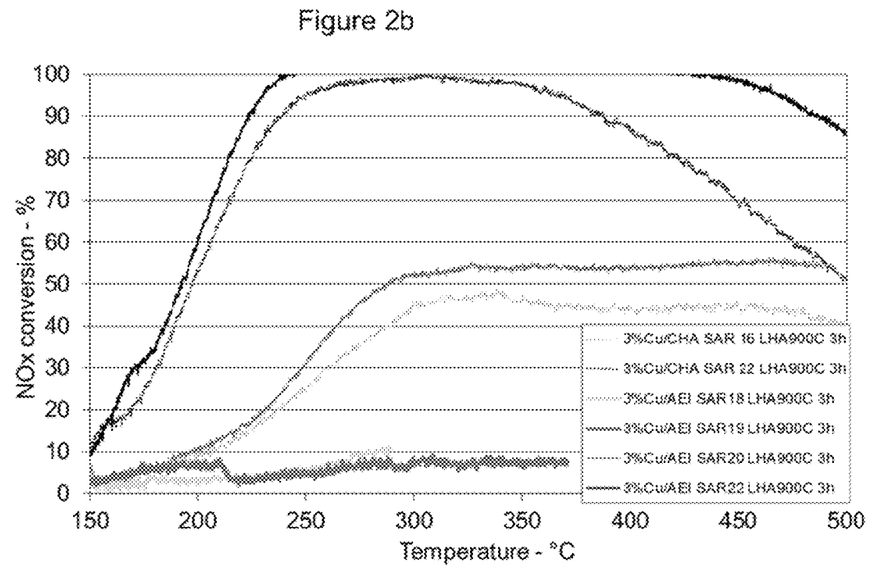

Another portion of the material from each catalyst sample described above was hydrothermally aged at 900° C./4.5% water in air for 3 hours. After aging the powder samples were separately loaded into a synthetic catalyst activity test (SCAT) reactor and tested using a synthetic diesel exhaust gas mixture (at inlet) containing the following: 500 ppm NO, 385 ppm $NH_3$, 10% $O_2$, 10% $H_2O$, balance $N_2$ at a space velocity of 60,000 $h^{-1}$. The NOx conversion performance of each sample was tested over a range of temperatures. The results of these tests are provided in FIG. 2b.

The results show that the NOx conversion for an AEI catalyst after high temperature aging (i.e., 900° C.) was significantly better for samples with an SAR of at least 20 compared to samples having an SAR of less than 20. In addition, a high-temperature aged AEI aluminosilicate catalyst having an SAR of at least 20 had better performance compared to a high-temperature aged CHA aluminosilicate catalyst having a comparable SAR and copper loading.

Example 4

$NH_3$ Conversion Performance after High Temperature Aging

A 5 gram sample of AEI (SAR=22) powder similar to that described in Example 1 was treated with copper acetate using an incipient wetness technique to produce a catalyst loaded with 3 weight percent copper. Copper loaded samples of AEI (SAR 18), AEI (SAR 19), and AEI (SAR 20) were prepared using similar techniques.

Figure 3:
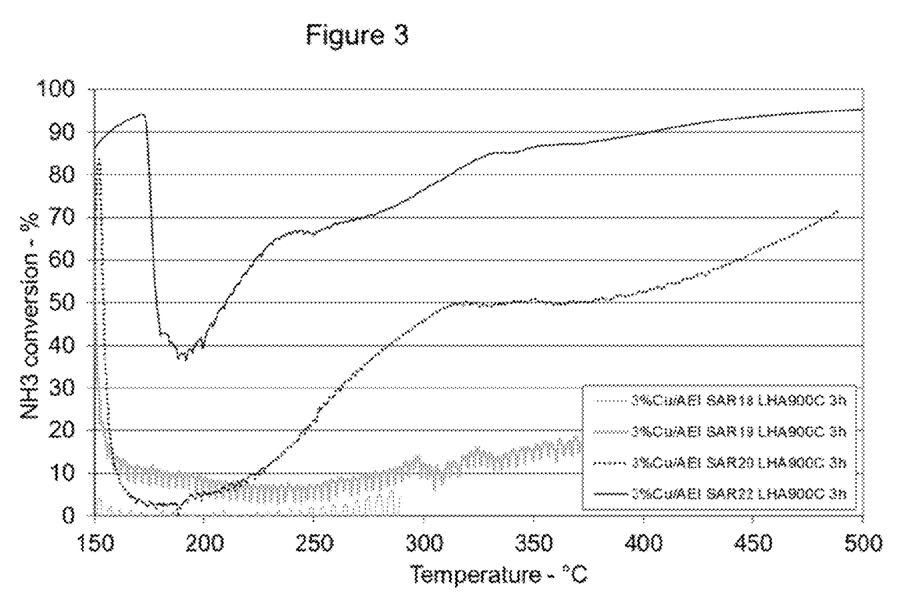
FIG. 3 shows $NH_3$ conversion performance of copper loaded AEI aluminosilicates after high temperature hydrothermal aging.

A portion of the material from each catalyst sample was hydrothermally aged at 900° C./4.5% water in air for 3 hours. After aging the powder samples were separately loaded into a synthetic catalyst activity test (SCAT) reactor and tested using a synthetic diesel exhaust gas mixture (at inlet) containing the following: 500 ppm NO, 385 ppm $NH_3$, 10% $O_2$, 10% $H_2 O$, balance $N_2$ at a space velocity of 60,000 $h^{-1}$. The $NH_3$ conversion performance of each sample was tested over a range of temperatures. The results of these tests are provided in FIG. 3.

The results of these test show a significant improvement in NH3 conversion for high temperature aged AEI aluminosilicate catalyst, provided that the SAR of the catalyst is at least 20.

Example 5

Catalytic Performance after Rich/Lean Aging

A sample of AEI (SAR=20) aluminosilicate powder similar to that described in Example 1 was treated with copper acetate using an incipient wetness technique to produce a catalyst loaded with 3 weight percent copper. Samples of 3 weight percent copper loaded CHA (SAR=26) and BEA aluminosilicates were also prepared using similar techniques.

A portion of the material from each catalyst sample was hydrothermally aged at 500° C./4.5% water in air for 2 hours. Another portion of each of the samples was subjected to alternating lean and rich aging conditions (5 seconds lean/15 seconds rich) for 12 hours by exposing the powder to the following gas compositions at 600° C. and at a space velocity of 30,000 hr$^{-1}$:

TABLE 1

| Gas Component | Rich (R) | Lean (L) |
|---|---|---|
| NO | 200 ppm | 200 ppm |
| $C_3H_6$ (as C1) | 5000 ppm | 0 |
| $H_2$ | 1.30% | 0 |
| CO | 4.00% | 0 |
| $O_2$ | 1.00% | 10% |
| H2O | 5% | 5% |
| $CO_2$ | 5% | 5% |

Figure 4A:
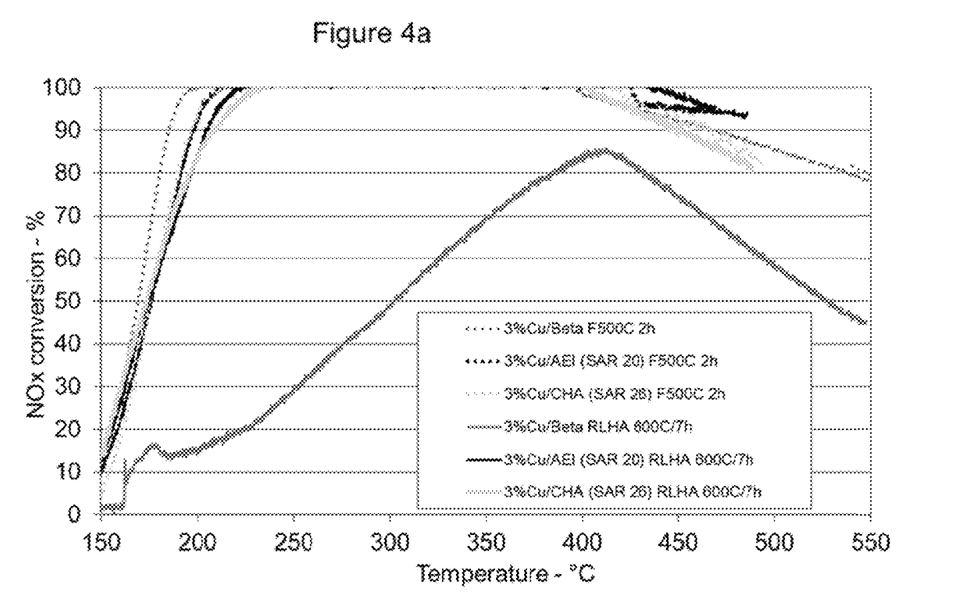
FIGS. 4a, 4b, and 4c show $NO_x$ and $NH_3$ performance of copper loaded AEI, CHA, and BEA aluminosilicates after lean/rich aging.
Figure 4B:
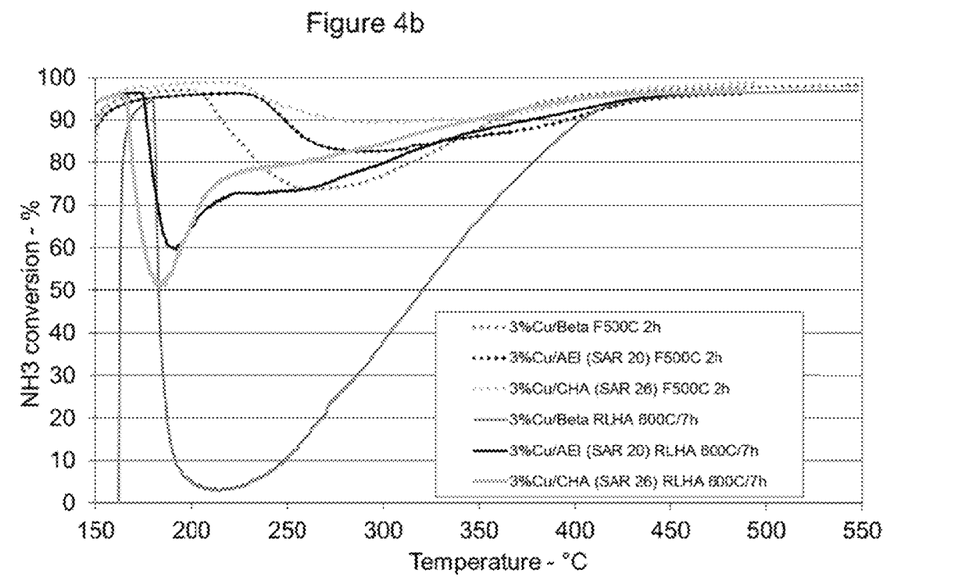
Figure 4C:
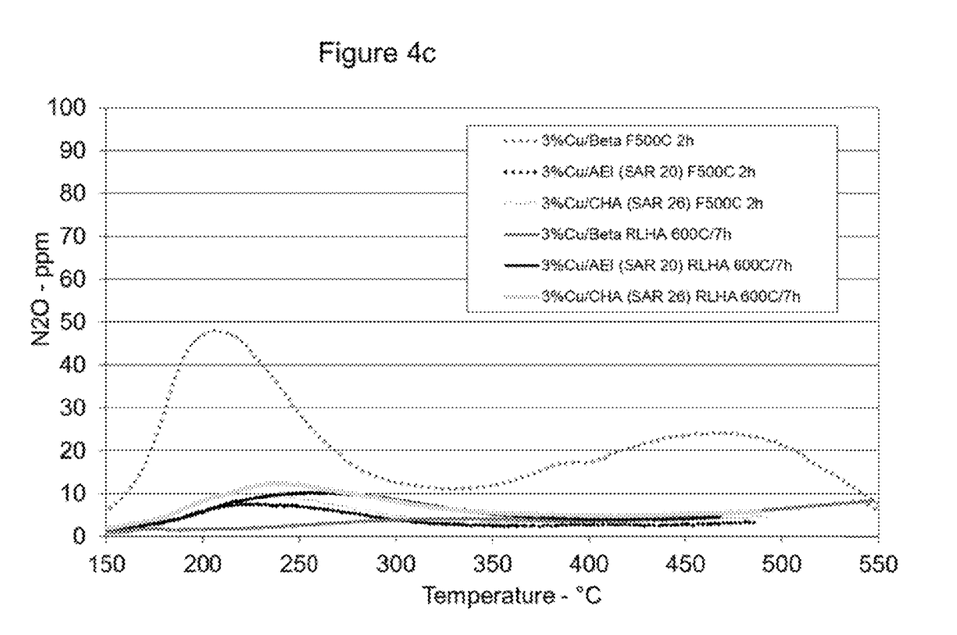

After lean/rich aging, the powder samples were separately loaded into a synthetic catalyst activity test (SCAT) reactor and tested using a synthetic diesel exhaust gas mixture (at inlet) similar to that described in Example 3. The NOx and $NH_3$ conversion performance of each sample was tested over a range of temperatures. The results of these tests are provided in FIGS. 4a, 4b, and 4c.

The data from these tests show that a copper loaded AEI aluminosilicate catalyst having an SAR of 20 has $NO_x$ and $NH_3$ conversion performance that is comparable to a copper loaded AEI aluminosilicate catalyst having an SAR of 26.

Example 6

Copper Load AEI Aluminosilicate

Samples of an AEI aluminosilicate were loaded with copper using an incipient wetness technique to produce the following loadings: 2.5 weight % copper, 3.0 weight % copper, 3.5 weight % copper, and 4.0 weight % copper. A portion of each of these samples was each hydrothermally aged at 50 0° C. for 2 hours. Another portion of each of the samples was hydrothermally aged at 750° C. for 80 hours. And another portion of each of the samples was hydrothermally aged at 900° C. for 2 hours.

Each of the samples was tested on a SCAT rig under conditions similar to those described in Example 3. The test indicate that copper loading of about 2.5 to about 3.5 weight percent yield superior $NO_x$ conversion at both 200° C. and at 475° C.

What is claimed is:

1. A catalytic article comprising:
   a. a catalyst composition comprising an aluminosilicate molecular sieve having an AEI structure, a mean crystal size of about 0.1 to about 15 μm, and being substantially free of halogens, and about 1 to about 5 weight percent of a promoter metal, based on the total weight of the molecular sieve material, and a binder comprising a component selected from alumina, silica, non-zeolite silica alumina, titania, zirconia, and ceria; and
   b. a particulate filter upon and/or within which the catalyst composition is disposed.

2. The catalytic article of claim 1, wherein the binder comprises alumina.

3. The catalytic article of claim 2, wherein the metal is selected from copper and iron.

4. The catalytic article of claim 2, wherein the alumina is gamma alumina and/or theta alumina.

5. The catalytic article of claim 2, wherein the binder consisting essentially of alumina.

6. The catalytic article of claim 2, wherein the filter is a wall-flow filter.

7. The catalytic article of claim 6, wherein the catalyst composition is a coating on or within the filter.

8. The catalytic article of claim 7, wherein the coating comprises a surface coating on the filter, a coating permeates the surface of the filter, or a combination thereof.

9. The catalytic article of claim 8, wherein the coating comprises a surface coating on the filter.

10. The catalytic article of claim 9, wherein the coating is on the inlet side of the filter.

11. The catalytic article of claim 10, wherein the filter further comprises an ammonia oxidation catalyst disposed on the outlet side of the filter.

12. The catalytic article of claim 2, wherein the filter has a porosity of about 40-70%.

13. The catalytic article of claim 2, wherein the filter has an efficiency of at least about 70%.

14. The catalytic article of claim 2, wherein the filter has a pore interconnectivity volume of at least about 30%.

15. The catalytic article of claim 2, wherein the filter has a mean pore size of about 10 to about 40 μm.

16. The catalytic article of claim 2, wherein the catalyst composition is a washcoat, and the washcoat is present on the filter at a concentration of about 1.5 to 2.5 g/in$^3$.

17. The catalytic article of claim 1, wherein said molecular sieve having an AEI framework has a SAR of about 15 to about 25, a mean crystal size of about 0.1 to about 10 μm.

18. The catalytic article of claim 17, wherein said mean crystal size is about 0.5 to 5 μm.

* * * * *